(12) United States Patent
Inoue et al.

(10) Patent No.: US 7,804,491 B2
(45) Date of Patent: Sep. 28, 2010

(54) TOUCH PANEL

(75) Inventors: Kenji Inoue, Osaka (JP); Shigeyuki Fujii, Osaka (JP)

(73) Assignee: Panasonic Corporation, Osaka (JP)

( * ) Notice: Subject to any disclaimer, the term of this patent is extended or adjusted under 35 U.S.C. 154(b) by 801 days.

(21) Appl. No.: 11/790,743

(22) Filed: Apr. 27, 2007

(65) Prior Publication Data
US 2008/0170041 A1 Jul. 17, 2008

(30) Foreign Application Priority Data
May 17, 2006 (JP) ............................. 2006-137542

(51) Int. Cl.
*G09G 3/41* (2006.01)
(52) U.S. Cl. .................... 345/173; 345/174; 178/18.01; 178/18.03; 178/18.05
(58) Field of Classification Search ......... 345/173–176; 178/18.01, 18.03, 18.05, 18.06, 18.07; 463/37–38; 200/512–517
See application file for complete search history.

(56) References Cited

U.S. PATENT DOCUMENTS

2004/0051699 A1   3/2004   Tanabe et al.
2006/0012576 A1*  1/2006   Hafez et al. .................. 345/173
2007/0182720 A1*  8/2007   Fujii et al. .................... 345/173
2007/0267285 A1* 11/2007   Yamaue et al. ............... 200/512
2007/0285398 A1* 12/2007   Karhiniemi et al. ......... 345/173
2008/0170040 A1*  7/2008   Tanabe et al. ................ 345/173

FOREIGN PATENT DOCUMENTS

JP      2003-58319      2/2003

* cited by examiner

*Primary Examiner*—Lun-Yi Lao
(74) *Attorney, Agent, or Firm*—Wenderoth, Lind & Ponack, L.L.P.

(57) ABSTRACT

A touch panel includes a first substrate, a second substrate, a slit, and a groove. The first substrate has a first conductive layer, and a plurality of first electrodes that extend from both ends of the first conductive layer and that have first electrode lead sections. The second substrate has a second conductive layer, and a plurality of second electrodes that extend form both ends of the second conductive layer and that have second electrode lead sections. The slit is provided in the first conductive layer and the second conductive layer and has an intersection or a terminal section. The groove section is provided to surround the intersection or the terminal section. This structure provides the touch panel that can have stable electrical connection and separation by a simple structure.

9 Claims, 7 Drawing Sheets

TOUCH PANEL

BACKGROUND OF THE INVENTION

1. Field of the Invention

The present invention mainly relates to a touch panel used for an operation of various electronic devices.

2. Background Art

In recent years, various electronic devices such as a mobile phone and a car navigation system having more sophisticated and diversified functions have increasingly incorporate therein an optically-transparent touch panel attached to a front face of a display element (e.g., liquid crystal). A user of such an electronic device depresses and operates the touch panel by a finger or a pen while visually recognizing, through the touch panel, the display on the display element at the back face of the touch panel. Through this operation, the respective functions of the electronic device are switched. Thus, such a touch panel has been required that has a superior visibility and that provides secure operation and electric connection.

A conventional touch panel will be described with reference to FIG. 8 to FIG. 10.

FIG. 8 is a cross-sectional view illustrating a conventional touch panel. FIG. 9 is a plan view illustrating an upper substrate used for the touch panel shown in FIG. 8. FIG. 10 is a plan view illustrating a lower substrate used for the touch panel shown in FIG. 8. In FIG. 8 to FIG. 10, upper substrate 101 has a film-like shape and is optically-transparent. Upper substrate 101 has, at a lower side thereof, optically-transparent lower substrate 102. On a lower surface of upper substrate 101, optically-transparent upper conductive layer 103 is formed by material such as indium tin oxide. On an upper surface of lower substrate 102, optically-transparent lower conductive layer 104 is similarly formed by material such as indium tin oxide for example.

Both ends of upper conductive layer 103 have a pair of upper electrodes 105, 106. Both ends of lower conductive layer 104 have a pair of lower electrodes 107, 108 formed in a direction orthogonal to upper electrodes 105, 106. Upper electrodes 105, 106 extend along an outer periphery of upper conductive layer 103. End of upper substrate 101 has a plurality of lead sections 105a, 106a. Lower electrodes 107, 108 extend along an outer periphery of lower conductive layer 104. End of lower substrate 102 has a plurality of lead sections 107a, 108a. It is noted that upper electrodes 105, 106 and lower electrodes 107, 108 are made of conductive material including silver.

Slit 109 is provided at an inner side of upper electrodes 105, 106 and between lead sections 105a, 106a. Slit 109 having a substantially T-like shape is obtained by removing upper conductive layer 103 by a method including a laser cutting or an etching processing, for example. Slit 110 is also provided between lower electrodes 107, 108, and between lead sections 107a, 108a. Slit 110 having a substantially L-like shape is similarly obtained by removing lower conductive layer 104 by the method including a laser cutting or an etching processing, for example. This prevents the short circuiting between upper electrode 105 and upper electrode 106, and between lower electrode 107 and lower electrode 108, thereby securing insulation among the electrodes.

At an upper surface of lower conductive layer 104, a plurality of dot spacers (not shown) made of insulating resin are formed with a predetermined interval thereamong. Spacer 111 having a substantially frame-like shape is provided at an outer periphery of a lower face of upper substrate 101 or an outer periphery of an upper face of lower substrate 102. An upper face and a lower face of spacer 111 are coated with adhesion layers (not shown). As a result, an outer periphery of upper substrate 101 is adhered with an outer periphery of lower substrate 102 and upper conductive layer 103 is facing to lower conductive layer 104 with a predetermined space therebetween. In this manner, touch panel 100 is provided.

Touch panel 100 thus structured is placed on a front face of a liquid crystal display element (not shown) and others, and is attached to an electronic device. Lead sections 105a, 106a, 107a, and 108a provided at end sections of upper electrodes 105, 106 and end sections of lower electrodes 107, 108 are connected to an electronic circuit of an electronic device (not shown) via a wiring substrate (not shown) in which upper and lower faces have a plurality of wiring patterns, for example.

In the structure as described above, an upper face of upper substrate 101 is depressed and operated by a finger or a pen while the display of a liquid crystal display element provided at the back face of touch panel 100 being visually recognized. As a result, upper substrate 101 is bent and upper conductive layer 103 at the depressed portion is come into contact with lower conductive layer 104.

Then, a voltage is sequentially applied from the electronic circuit via the wiring substrate to upper electrodes 105, 106 as well as lower electrodes 107, 108. The applied voltage is sequentially applied to the both ends of upper conductive layer 103 and the both ends of lower conductive layer 104 in a direction orthogonal to upper conductive layer 103. Based on a voltage ratio of upper electrodes 105, 106 and a voltage ratio of lower electrodes 107, 108, the depressed position is detected by the electronic circuit. As a result, various functions of the electronic device are switched.

In touch panel 100 having the conventional structure as described above, slits 109, 110 are formed by the method including a laser cutting or an etching processing as described above. Among them, a laser cut processing has been increasingly used in recent years because it provides a speedy manufacture. However, when slit 109 is formed by a laser cut processing, for example, the processing is actually performed to cause protruded section 109b, as shown in FIG. 9, that inwardly protrudes from intersection 109a having a substantially T-like shape. Specifically, protruded section 109b is caused by the control of a laser beam for machining slit 109.

When a strong force is applied to a position adjacent to intersection 109a as shown in FIG. 9 or terminal section 110a of slit 110 as shown in FIG. 10 for example, or when such a part is subjected to a depression operation repeated for a long time, this part may crack or break to cause a crack or breakage of upper conductive layer 103 and lower conductive layer 104. This causes unstable electrical connection and separation between upper conductive layer 103 and lower conductive layer 104.

To prevent such a situation, slit 109 is formed by a laser beam with a slowly controlled moving speed so that the laser beam does not move beyond intersection 109a, although the moving speed causes a longer manufacture time. Alternatively, a part adjacent to intersection 109a and a part adjacent to terminal section 110a are covered by spacer 111, although the existence of spacer 111 reduces an operation region, for example.

A conventional touch panel is disclosed, for example, in Japanese Patent Unexamined Publication No. 2003-58319.

SUMMARY OF THE INVENTION

The present invention provides a touch panel that provides stable electrical connection and separation by a simple structure.

The touch panel of the present invention has a first optically-transparent substrate, a second optically transparent substrate, a slit, and a groove section. The first substrate has a first conductive layer and a plurality of first electrodes extending from both ends of the first conductive layer and having first electrode lead sections. The second substrate has a second conductive layer, and a plurality of second electrodes extending from both ends of the second conductive layer and having second electrode lead sections. The slit is formed in the first conductive layer and the second conductive layer, and has an intersection or a terminal section. The groove section is provided around the intersection or around the terminal section. This structure can provide the touch panel that can provide stable electrical connection and separation by a simple structure.

DETAILED DESCRIPTION OF THE INVENTION

Hereinafter, an embodiment of the present invention will be described with reference to FIG. 1 to FIG. 7.

Embodiment

Figure 1:
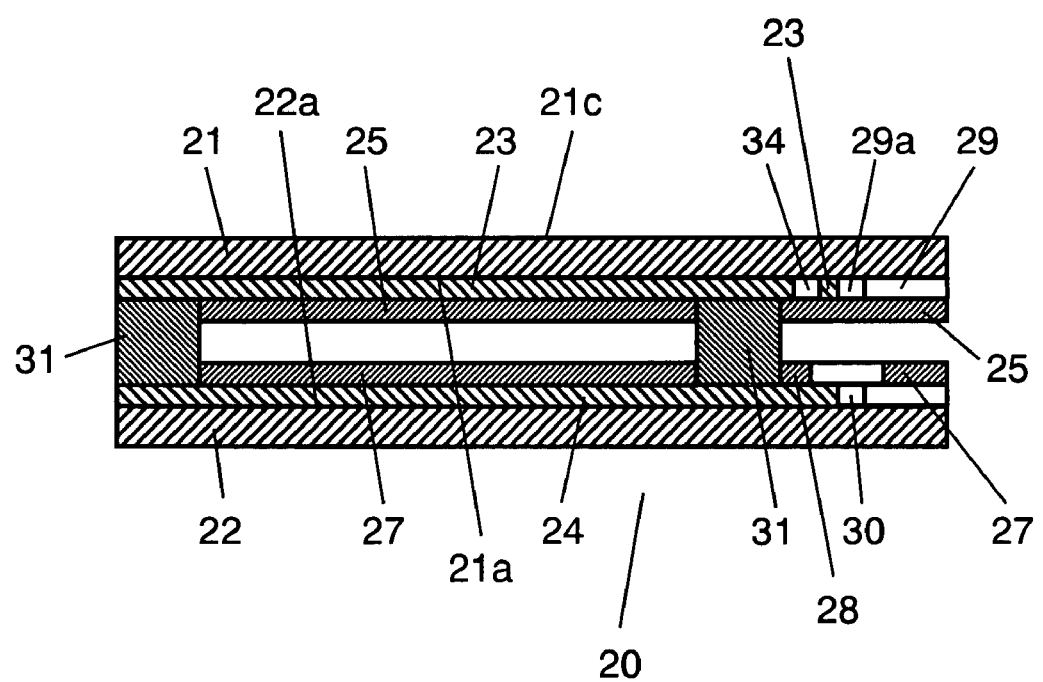
FIG. 1 is a schematic sectional view illustrating a touch panel according to an embodiment of the present invention.
Figure 2:
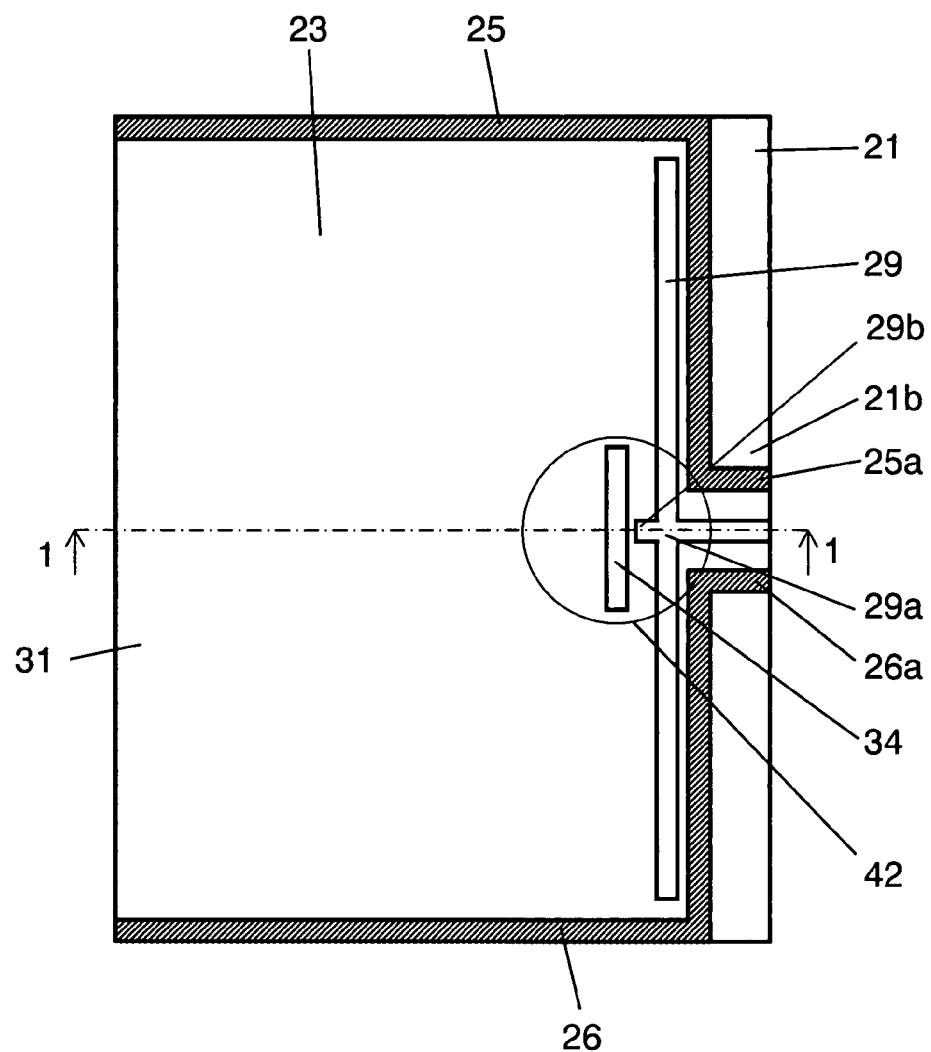
FIG. 2 is a plan view illustrating an upper substrate used for the touch panel shown in FIG. 1.
Figure 3:
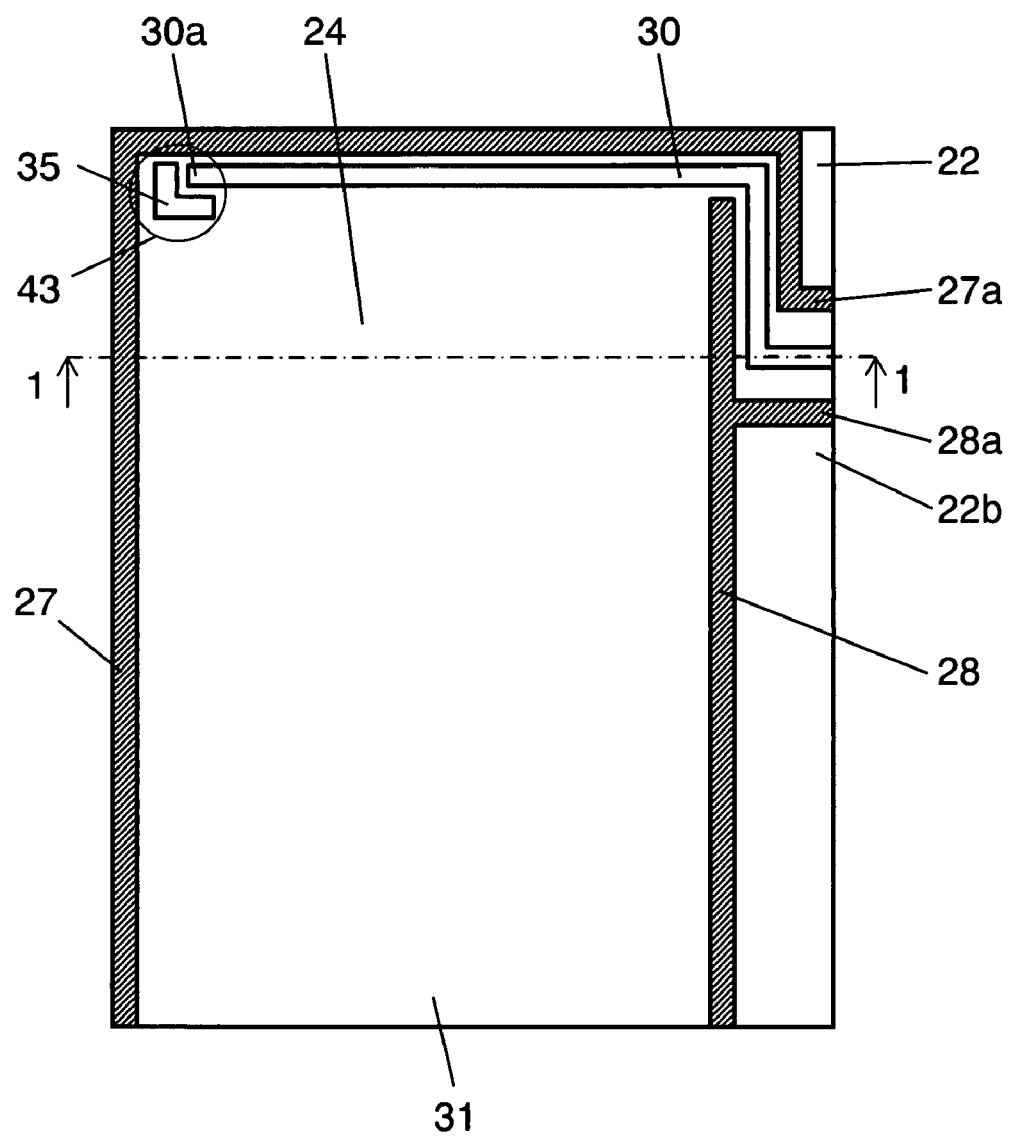
FIG. 3 is a plan view illustrating a lower substrate used for the touch panel shown in FIG. 1.

FIG. 1 is a schematic cross sectional view illustrating a touch panel according to an embodiment of the present invention. FIG. 2 is a plan view illustrating an upper substrate used for the touch panel shown in FIG. 1. FIG. 3 is a plan view illustrating a lower substrate used for the touch panel shown in FIG. 1. It is noted that, in the schematic cross sectional view of the touch panel shown in FIG. 1, the cross section of the upper substrate is taken along cross section line 1-1 shown in FIG. 2 while the cross section of the lower substrate is taken along cross section line 1-1 shown in FIG. 3.

In FIG. 1 to FIG. 3, first substrate 21 is an upper substrate that has a film-like shape, that is optically-transparent, and that is made of optically-isotropic material such as polyethylene terephthalate or polycarbonate resin. Second substrate 22 is a lower substrate that is made of optically-isotropic material such as glass, acrylic resin, or polycarbonate resin and that is optically-transparent. First face 21a, which is a lower face of first substrate 21, has first conductive layer 23 as an optically-transparent upper conductive layer. Second face 22a, which is an upper face of second substrate 22, has second conductive layer 24 as an optically-transparent lower conductive layer. First conductive layer 23 and second conductive layer 24 are formed by material such as indium tin oxide or tin oxide by a method such as the sputter method for example, respectively. First conductive layer 23 and second conductive layer 24 formed by the sputter method or the like are modified to have a predetermined shape by a method such as a laser cut or etching processing.

First electrodes 25, 26, which are a pair of upper electrodes, are provided at both ends of first conductive layer 23. At both ends of second conductive layer 24 in a direction orthogonal to a direction of the both ends of first conductive layer 23 having first electrodes 25, 26, second electrodes 27, 28 are formed as a pair of lower electrodes. First electrodes 25, 26 extend at an outer periphery of first conductive layer 23 and first electrode lead sections 25a, 26a are provided at end section 21b of first substrate 21. Similarly, second electrodes 27, 28 extend at an outer periphery of second conductive layer 24 and second electrode lead sections 27a, 28b are provided at end section 22b of second substrate 22. It is noted that first electrodes 25, 26 and second electrodes 27, 28 are formed by conductive material such as silver or carbon. First electrodes 25, 26 and second electrodes 27, 28 form electrodes. First electrode lead sections 25a, 26a as well as second electrode lead sections 27a, 28a form an electrode lead section.

First slit 29 having a substantially T-like shape is provided at an inner side of first electrodes 25, 26 and between first electrode lead sections 25a, 26a. First slit 29 is obtained by removing first conductive layer 23 by a laser cutting or an etching processing, for example. Similarly, second slit 30 having a substantially L-like shape is provided between second electrodes 27, 28 and between second electrode lead sections 27a, 28a. Second slit 30 is obtained by removing second conductive layer 24 by a laser cutting or an etching processing, for example. The existence of first slit 29 suppresses the short-circuiting between first electrode 25 and first electrode 26 to maintain the insulation therebetween. Similarly, the existence of second slit 30 suppresses the short-circuiting between second electrode 27 and second electrode 28 to maintain the insulation therebetween.

First groove section 34 is provided to be adjacent to an inner side of intersection 29a of first slit 29 at first substrate 21. First groove section 34 is obtained by removing first conductive layer 23 by a laser cutting or an etching processing, for example. Second groove section 35 having a substantially L-like shape is provided to be adjacent to a periphery of terminal section 30a of second slit 30 at second substrate 22. Second groove section 35 is obtained by removing second conductive layer 24 by a laser cuffing or an etching processing, for example. First slit 29 and second slit 30 constitute slits, and first groove section 34 and second groove section 35 constitute groove sections. Alternatively, protruded section 29b slightly inwardly protruding from intersection 29a also may be provided. Specifically, protruded section 29b is caused by the control of a laser beam moved for machining first slit 29, for example.

Second conductive layer 24 has thereon a plurality of dot spacers (not shown) made by insulating resin (e.g., epoxy resin, silicone resin) with a predetermined interval thereamong.

Spacer 31 having a substantially frame-like shape is provided at an outer periphery of first face 21a or at an outer periphery of second face 22a. Spacer 31 made by material such as polyester resin or epoxy resin is formed by a method such as printing. Adhesion layer (not shown, e.g., acrylic resin, rubber) coated on either both sides or one side of an upper face and a lower face of spacer 31 adheres the outer periphery of first substrate 21 with the outer periphery of second substrate 22. In this manner, first conductive layer 23 is facing to second conductive layer 24 with a predetermined gap therebetween. Touch panel 20 is structured in the manner as described above. It is noted that the term "frame-like" herein means a frame-like shape including only the outer frame of a polygonal shape (e.g., quadrilateral shape).

As described above, first conductive layer 23 and second conductive layer 24 are formed by the sputter method or the like. Then, a method (e.g., laser cut, etching processing) is used to remove first conductive layer 23 and second conductive layer 24 to form first slit 29, second slit 30, first groove section 34 and second groove section 35. Then, a method such as printing is used to form first electrodes 25, 26, second electrodes 27, 28, first electrode lead sections 25a, 26b, and second electrode lead sections 27a, 28a.

Touch panel 20 thus structured is placed on a front face of a liquid crystal display element (not shown) or the like and is attached to an electronic device (not shown). Then, first electrode lead sections 25a, 26a as well as second electrode lead sections 27a, 28a are connected to an electronic circuit (not shown) of the electronic device, for example, via a wiring substrate (not shown) or the like having a plurality of wiring patterns in an upper face and a lower face.

Through the structure as described above, a user of the electronic device depresses and operates upper face 21c of first substrate 21 by a finger or a pen for example while visually recognizing the display by the liquid crystal display element provided at a back face of touch panel 20. As a result, first substrate 21 is bent to cause first conductive layer 23 at the depressed portion to be come into contact with second conductive layer 24.

Then, a voltage is sequentially applied from the electronic circuit via the wiring substrate to first electrodes 25, 26 and second electrodes 27, 28, respectively. The voltages applied to first electrodes 25, 26 and second electrodes 27, 28 are sequentially applied to the both ends of first conductive layer 23 and the both ends of second conductive layer 24 in a direction orthogonal to the both ends of first conductive layer 23, respectively. Then, based on the voltage ratio of first electrodes 25, 26 and the voltage ratio of second electrodes 27, 28, the depressed position is detected by the electronic circuit. As a result, various functions of the electronic device are switched.

When touch panel 20 is depressed and operated, a strong force may be applied to a part in the vicinity of intersection 29a of first slit 29 or terminal section 30a of second slit 30. Alternatively, a depression operation may be repeated for a long time. Thus, a part in the vicinity pf intersection 29a or terminal section 30a may be cracked or broken to cause a crack or breakage of first conductive layer 23 and second conductive layer 24. However, touch panel 20 has first groove section 34 in the vicinity of intersection 29a and second groove section 35 in the vicinity of terminal section 30a. The existence of first groove section 34 prevents, even when a crack or a breakage is caused in the vicinity of intersection 29 of first conductive layer 23, a further crack or breakage to the inner side of first conductive layer 23. Similarly, even when a crack or a breakage is caused in the vicinity of terminal section 30a of second conductive layer 24, the existence of second groove section 35 prevents a further crack or breakage to the inner side of second conductive layer 24.

Specifically, even when intersection 29a has a crack or a breakage, the crack or breakage extends to first groove section 34 but does not expand further, and is prevented from expanding to the inner side of first conductive layer 23. Similarly, even when terminal section 30a has a crack or a breakage, the crack or breakage extends to second groove section 35 but does not expand further, and is prevented from expanding to the inner side of second conductive layer 24. This prevents the crack or breakage from extending, due to an electrical connection of touch panel 20, to the inner part of first conductive layer 23 or the inner part of second conductive layer 24, thereby providing stable electrical connection and separation.

As described above, according to this embodiment, first conductive layer 23 includes first slit 29 having a predetermined shape and first groove section 34 is provided in the vicinity of intersection 29a of first slit 29 or at the periphery of intersection 29a. Thus, first groove section 34 prevents a crack or a breakage from intersection 29a from extending to the inner side of first conductive layer 23. Thus, touch panel 20 can be obtained that provides stable electrical connection and separation of first conductive layer 23 by a simple structure.

Similarly, second conductive layer 24 includes second slit 30 having a predetermined shape. Furthermore, second groove section 35 is provided at the periphery of terminal section 30a of second slit 30 or in the vicinity of terminal section 30a. Thus, second groove section 35 prevents a crack or a breakage from terminal section 30a from extending to the inner side of second conductive layer 24. Thus, touch panel 20 can be obtained that provides stable electrical connection and separation of second conductive layer 24 by a simple structure.

First groove section 34 and second groove section 35 are formed by a laser cut processing, for example, at the same time as the formation of first slit 29 or second slit 30. This can eliminate an unnecessary machining time and thus realizes the manufacture of touch panel 20 with a low cost.

The above description has described a structure in which first groove section 34 and second groove section 35 are provided both at the inner side of intersection 29a of first slit 29 at first substrate 21 and at the periphery of terminal section 30a of second slit 30 at second substrate 22. However, both of first groove section 34 and second groove section 35 are not always required. The present invention also can be carried out by another structure in which, depending on the structure of touch panel 20 or an electronic device connected to touch panel 20 for example, an insulating groove is provided at any one of such groove sections that receives a concentrated force when touch panel 20 is depressed and operated.

Furthermore, the shapes and arrangements of first electrodes 25, 26, second electrodes 27, 28, first slit 29 and second slit 30 are not limited to the above-described shapes and arrangements. For example, second electrodes 27, 28 and second slit 30 also may be provided in first substrate 21, and first electrodes 25, 26 and first slit 29 also may be provided in second substrate 22.

Figure 4:
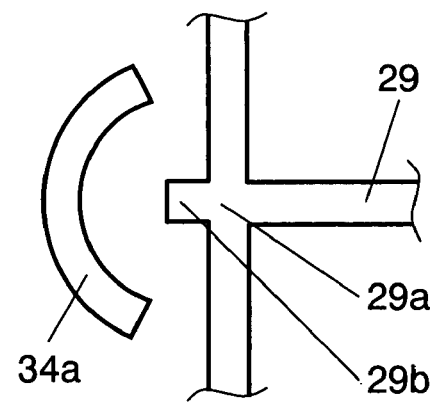
FIG. 4 is an expanded plan view illustrating the main part of an upper substrate of another arrangement used for the touch panel according to an embodiment of the present invention.

The shape of first groove section 34 is also not limited to the above-described shape. For example, first groove section 34 at the inner side of intersection 29a, as shown in FIG. 4, also may be first groove section 34a having a substantially umbrella-like shape or a substantially circular arc-like shape and thus may have various shapes.

When first groove section 34 has a curvature to the direction of intersection 29a as in first groove section 34a, an effect for suppressing a further crack or breakage from intersection 29a is further improved. When intersection 29a or protruded section 29b is positioned at the center of the circular arc of first groove section 34a having a curvature, expansion of a crack or a breakage caused in the vicinity of intersection 29a or protruded section 29b can be efficiently suppressed. When first groove section 34 has, as in first groove section 34a, a shape to surround intersection 29a or protruded section 29b, a crack or a breakage caused in the vicinity of intersection 29a or protruded section 29b is suppressed from expanding in the respective directions. Thus, touch panel 20 can be obtained that can have further stable electrical connection and separation.

Figure 5:
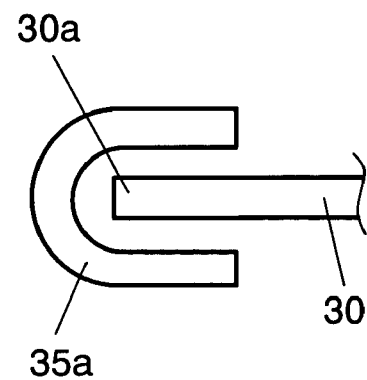
FIG. 5 is an expanded plan view illustrating the main part of a lower substrate of another arrangement used for the touch panel according to an embodiment of the present invention.
Figure 6:
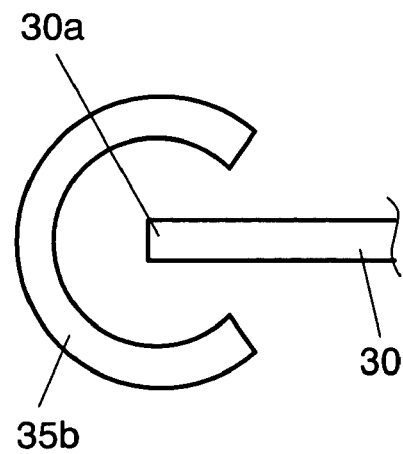
FIG. 6 is an expanded plan view illustrating the main part of a lower substrate of another arrangement used for the touch panel according to an embodiment of the present invention.
Figure 7:
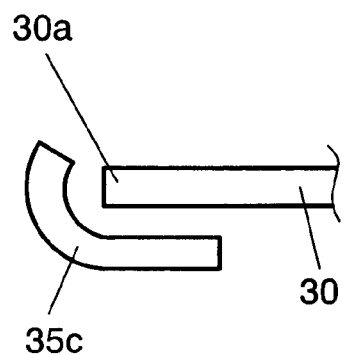
FIG. 7 is an expanded plan view illustrating the main part of a lower substrate of another arrangement used for the touch panel according to an embodiment of the present invention.
Figure 8:
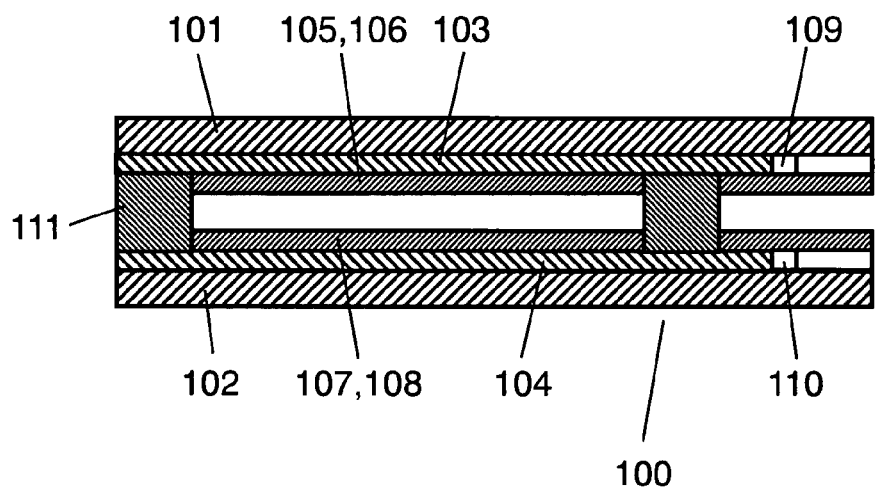
FIG. 8 is a cross-sectional view illustrating a conventional touch panel.
Figure 9:
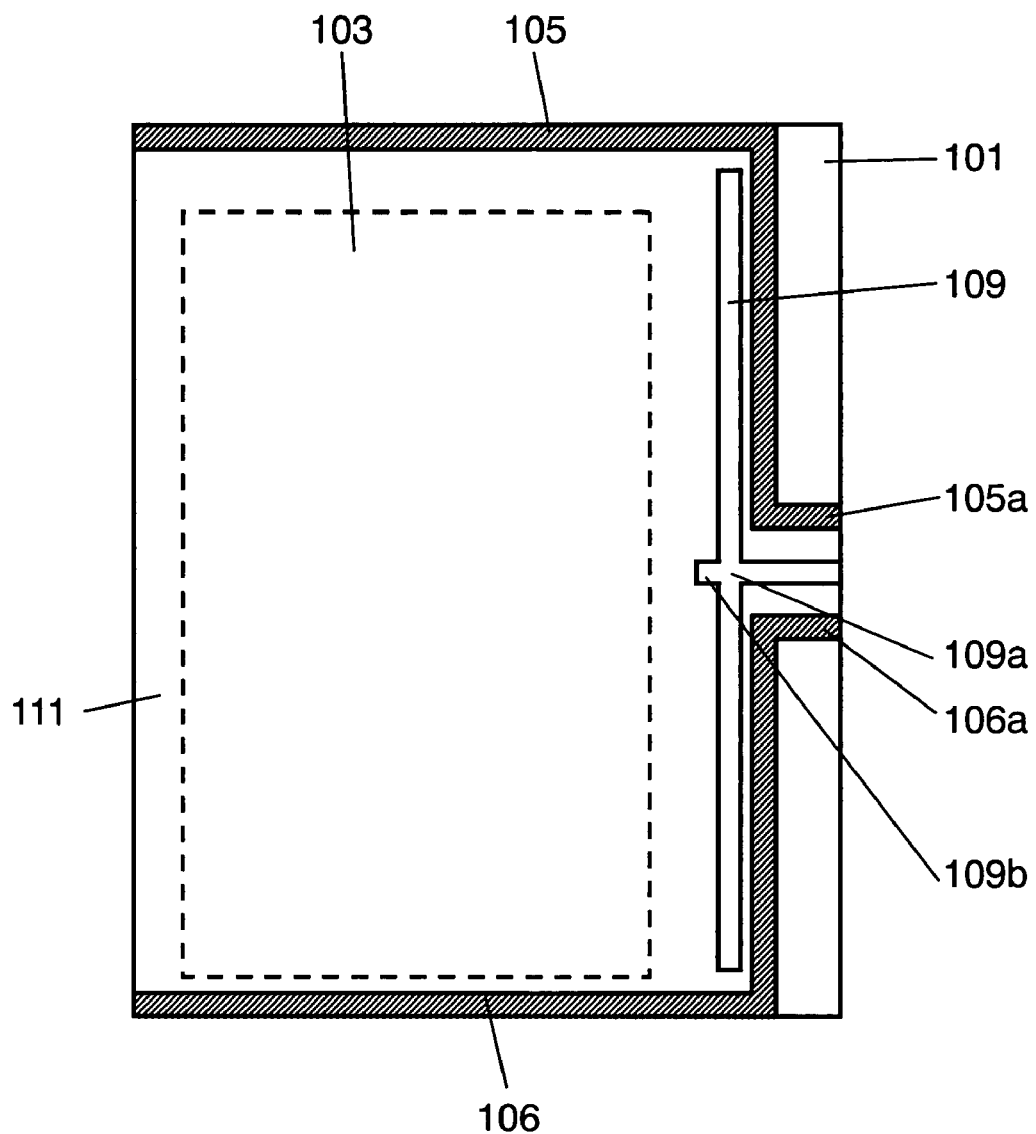
FIG. 9 is a plan view illustrating an upper substrate used for the conventional touch panel.
Figure 10:
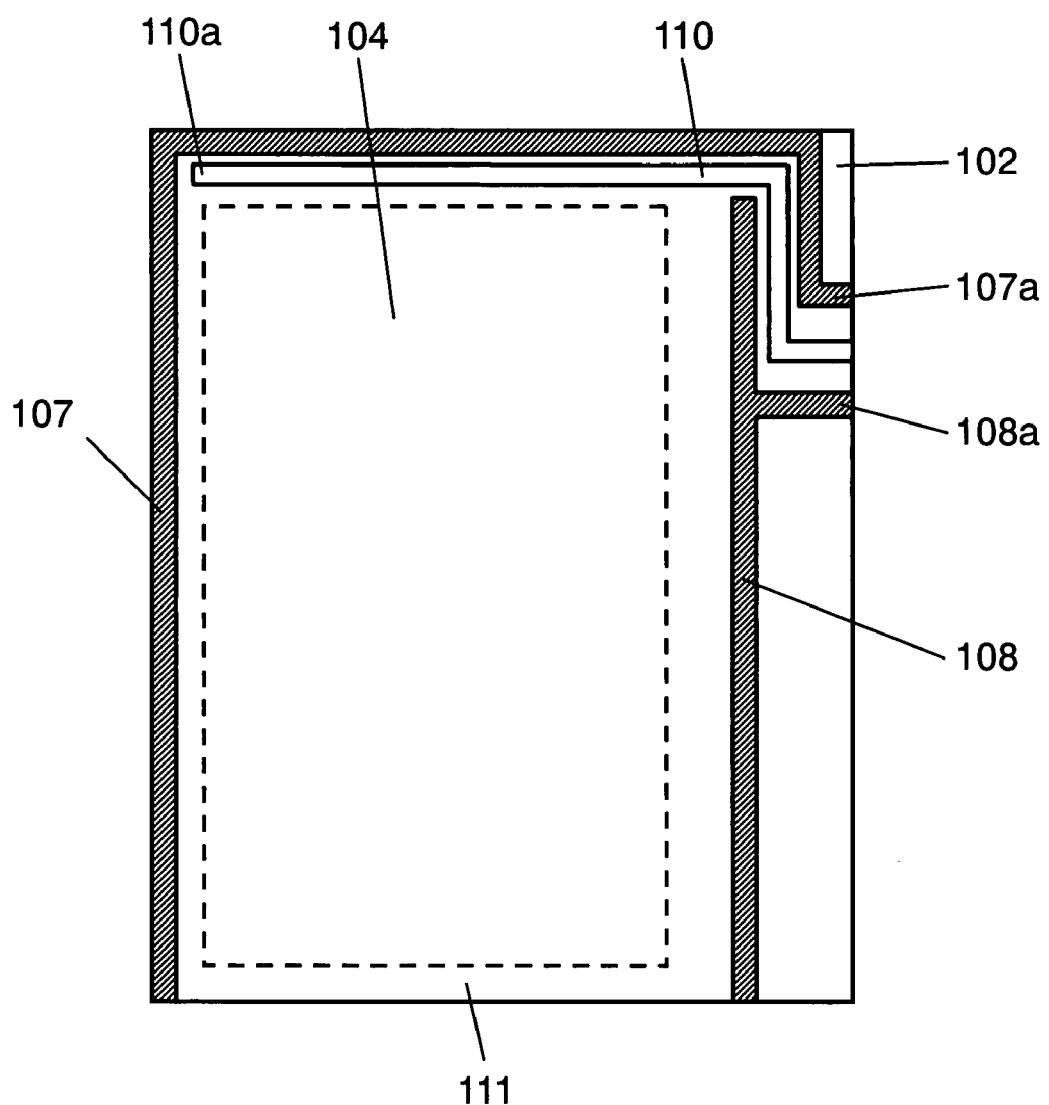
FIG. 10 is a plan view illustrating a lower substrate used for the conventional touch panel.

Similarly, the shape of second groove section 35 is not limited to the above-described shape. For example, second groove section 35 around terminal section 30a may be substantially U-like second groove section 35a as shown in FIG. 5 or also may be substantially horseshoe-like or substantially C-like second groove section 35b as shown in FIG. 6. Second groove section 35 also may be substantially J-like second groove section 35c as shown in FIG. 7. Specifically, various shapes can be used.

It is noted that the structure in which second groove section 35 has a curvature in the direction of terminal section 30a as in second groove sections 35a, 35b, and 35c can further enhance the effect for suppressing a crack or breakage caused at terminal section 30a from expanding. The structure in which terminal section 30a is positioned at the center of the circular arc of second groove sections 35a, 35b, and 35c having a curvature can efficiently suppress a crack or breakage caused in the vicinity of terminal section 30a from expanding. The structure in which second groove section 35 surrounds, as in second groove sections 35a, 35b, and 35c, terminal section 30a suppresses a crack or a breakage caused in the vicinity of terminal section 30a from expanding in the respective directions. Thus, touch panel 20 can be obtained that can have further stable electrical connection and separation.

FIG. 4 is an expanded plan view illustrating the main part of an upper substrate of another embodiment. FIG. 4 is an expanded plan view illustrating the main part of part 42 of FIG. 2. FIG. 5, FIG. 6, and FIG. 7 are an expanded plan views illustrating the main part of a lower substrate of another embodiment. FIG. 5, FIG. 6, and FIG. 7 are an expanded plan views illustrating the main part of part 43 of FIG. 3.

The above section has described a structure in which first electrodes 25, 26 extend at the outer periphery of first conductive layer 23, end section 21b of first substrate 21 includes first electrode lead sections 25a, 26a, second electrodes 27, 28 extend at the outer periphery of second conductive layer 24, and end section 22b of second substrate 22 includes second electrode lead sections 27a, 28a. However, the present invention also can be applied to another structure in which any one of first electrode lead sections 25a, 26a or second electrode lead sections 27a, 28a is introduced via a through hole (e.g., silver, copper) and any of end section 21b of first substrate 21 or end section 22b of second substrate 22 includes four electrode lead sections. The four electrode lead sections include first electrode lead sections 25a, 26a and second electrode lead sections 27a, 28a.

The above section also has described a structure in which the outer periphery of first substrate 21 and the outer periphery of second substrate 22 are adhered by spacer 31 and adhesion layer. However, the present invention is not always limited to the structure in which the outer periphery of first substrate 21 and the outer periphery of second substrate 22 are adhered by spacer 31 and adhesion layer. The invention also can be applied to another structure not using spacer 31 for example so long as the structure has first substrate 21 facing to second substrate 22 with a predetermined gap therebetween. Still another structure also may be used in which the outer periphery of first substrate 21 is adhered to the outer periphery of second substrate 22 by a two-sided tape having surfaces coated with adhesive agent (not shown).

What is claimed is:

1. A touch panel comprising:
    a first substrate having optical transparency and including:
        a first face,
        a first conductive layer on the first face, and
        a plurality of first electrodes extending from both ends of the first conductive layer and having first electrode lead sections;
    a second substrate having optical transparency and including:
        a second face,
        a second conductive layer on the second face and facing to the first conductive layer with a gap between the first and second conductive layers, and
        a plurality of second electrodes extending from both ends of the second conductive layer in a direction orthogonal to the both ends of the first conductive layer having the first electrodes and having second electrode lead sections; and
    a slit in the first conductive layer and the second conductive layer and having an intersection or a terminal section; and
    a groove surrounding the intersection or terminal section, wherein the groove is separated in distance from the slit.

2. The touch panel according to claim 1, wherein:
    the groove is shaped to have a curvature.

3. The touch panel according to claim 2, wherein:
    the intersection or terminal section is positioned at the center of the curvature shape of the groove.

4. The touch panel according to claim 1, wherein:
    the groove has a circular arc-like shape.

5. The touch panel according to claim 1, wherein:
    the groove has at least one of a U-like shape, a horseshoe-like shape, and a J-like shape.

6. The touch panel according to claim 1, wherein the first conductive layer comprises sputter formed material formed on the first face.

7. The touch panel according to claim 1, wherein the second conductive layer comprises sputter formed material formed on the second face.

8. The touch panel according to claim 1, wherein at least one of the first electrodes comprises printed conductive material formed on the first conductive layer.

9. The touch panel according to claim 1, wherein at least one of the second electrodes comprises printed conductive material formed on the second conductive layer.

* * * * *